US006984428B2

(12) United States Patent
Krawinkel et al.

(10) Patent No.: US 6,984,428 B2
(45) Date of Patent: Jan. 10, 2006

(54) PRESSURE-SENSITIVE ADHESIVE MASS AND THE USE THEREOF

(75) Inventors: Thorsten Krawinkel, Hamburg (DE); Kerstin Franck, Hamburg (DE); Bernd Lühmann, Norderstedt (DE)

(73) Assignee: tesa Aktiengesellschaft, Hamburg (DE)

(*) Notice: Subject to any disclaimer, the term of this patent is extended or adjusted under 35 U.S.C. 154(b) by 0 days.

(21) Appl. No.: 10/450,305

(22) PCT Filed: Nov. 2, 2001

(86) PCT No.: PCT/EP01/12688

§ 371 (c)(1),
(2), (4) Date: Jan. 6, 2004

(87) PCT Pub. No.: WO02/38692

PCT Pub. Date: May 16, 2002

(65) Prior Publication Data
US 2004/0110882 A1 Jun. 10, 2004

(30) Foreign Application Priority Data
Nov. 10, 2000 (DE) .................................. 100 55 942

(51) Int. Cl.
B32B 7/12 (2006.01)
B32B 25/16 (2006.01)

(52) U.S. Cl. ............. 428/41.3; 428/354; 428/355 RA; 428/355 EN; 428/355 BL; 524/111; 524/303; 524/304; 524/349; 524/350; 524/505; 156/327; 156/334

(58) Field of Classification Search ................ 524/111, 524/303–304, 349–350; 428/41.3, 354, 355 RA, 428/355 EN, 355 BL
See application file for complete search history.

(56) References Cited

U.S. PATENT DOCUMENTS

| 4,024,312 A | | 5/1977 | Korpman .................... 428/343 |
| 5,507,464 A | | 4/1996 | Hamerski et al. ............ 248/683 |
| 5,510,423 A | * | 4/1996 | Van Dijk et al. ............ 525/316 |
| 5,516,581 A | | 5/1996 | Kreckel et al. ........... 428/317.3 |
| 5,554,697 A | | 9/1996 | Van Dijk et al. ............ 525/314 |
| 5,672,402 A | | 9/1997 | Kreckel et al. ............ 428/34.2 |
| 5,736,612 A | | 4/1998 | Van Dongen et al. ....... 525/314 |
| 5,925,459 A | | 7/1999 | Zimmermann et al. ..... 428/354 |
| 5,994,450 A | * | 11/1999 | Pearce ........................ 524/505 |
| 6,187,845 B1 | * | 2/2001 | Renz et al. .................... 524/91 |
| 6,376,584 B1 | * | 4/2002 | Galbo et al. ................. 524/102 |
| 6,451,865 B1 | * | 9/2002 | Migchels et al. ............. 521/54 |
| 6,486,229 B1 | * | 11/2002 | Hu et al. ....................... 522/80 |
| 6,579,915 B2 | * | 6/2003 | Kroll et al. .................. 522/109 |
| 6,585,989 B2 | * | 7/2003 | Herbst et al. ................ 424/404 |
| 2002/0016381 A1 | * | 2/2002 | Kroll et al. .................. 522/109 |
| 2003/0199604 A1 | * | 10/2003 | Kroll et al. .................. 522/109 |

FOREIGN PATENT DOCUMENTS

| DE | 33 31 061 A1 | 3/1985 |
| DE | 42 22 849 C2 | 6/1993 |
| DE | 42 33 872 C2 | 3/1994 |
| DE | 44 28 587 C2 | 2/1996 |
| DE | 44 31 914 C2 | 3/1996 |
| DE | 196 26 870 | 7/1996 |
| DE | 196 27 400 | 7/1996 |
| DE | 195 11 288 C2 | 10/1996 |
| DE | 195 31 696 A1 | 3/1997 |
| DE | 197 08 366 A1 | 1/1998 |
| DE | 196 49 636 A1 | 6/1998 |
| DE | 196 49 727 A1 | 6/1998 |
| DE | 196 49 728 A1 | 6/1998 |
| DE | 196 49 729 A1 | 6/1998 |
| DE | 197 08 364 A1 | 9/1998 |
| DE | 197 23 177 A1 | 10/1998 |
| DE | 197 20 145 A1 | 11/1998 |
| DE | 197 56 816 C1 | 2/1999 |
| DE | 197 56 084 A1 | 7/1999 |
| DE | 198 20 858 A1 | 11/1999 |
| DE | 198 42 864 A1 | 3/2000 |
| DE | 198 42 865 A1 | 3/2000 |
| EP | 0 636 654 * | 2/1995 |
| EP | 0 636 654 A1 | 2/1995 |
| WO | WO 92/11332 | 7/1992 |
| WO | WO 92/11333 | 7/1992 |
| WO | WO 94/21157 | 9/1994 |
| WO | WO 95/06691 | 3/1995 |
| WO | WO 97/07172 | 2/1997 |
| WO | WO 98/03601 | 1/1998 |
| WO | WO 99/31193 | 6/1999 |
| WO | WO 99/37729 | 7/1999 |
| WO | WO 99/63018 | 12/1999 |

OTHER PUBLICATIONS

Specification—U.S. Appl. No. 09/160,777, filed Sep. 24, 1998 English language counterpart to DE 195 31 696.
Specification—U.S. Appl. No. 08/618,707, filed Mar. 20, 1996 English language counterpart to DE 195 11 288.

* cited by examiner

*Primary Examiner*—Peter Szekely
(74) *Attorney, Agent, or Firm*—Norris McLaughlin & Marcus PA

(57) ABSTRACT

Pressure sensitive adhesive strip which is detachable without destruction and without leaving a residue.

14 Claims, No Drawings

PRESSURE-SENSITIVE ADHESIVE MASS AND THE USE THEREOF

The invention relates to a pressure sensitive-adhesive for single-sidedly and double-sidedly pressure-sensitively adhesive sheet-strips which are redetachable without residue or destruction by extensive stretching in the bond plane, and with which neither the substrate nor the article to be bonded is discolored.

Elastically or plastically highly extensible self-adhesive tapes which can be redetached without residue or destruction by extensive stretching in the bond plane (also referred to below as strippable self-adhesive tapes) are known from U.S. Pat. No. 4,024,312, DE 3331 016, WO 92/11332, WO 92/11333, DE 42 22 849, WO 95/06691, DE 19531 696, DE 196 26 870, DE 19649 727, DE 196 49 728, DE 19649729, DE 19708364, DE 19720 145, and 198 20858.

They are frequently employed in the form of single-sidedly or double-sidedly pressure-sensitively adhesive sheet strips (adhesive tape-strips, adhesive strips), which preferably have a nonadhesive grip tab region from which the detachment process is initiated. Particular applications of self-adhesive tapes of this kind can be found inter alia in DE 42 33 872, DE 19511 288, U.S. Pat. No. 5,507,464, U.S. Pat. No. 5,672,402 and WO 94/21157; specific embodiments are described, for example, in DE 44 28 587, DE 44 31 914, WO 97/07172, DE 196 27 400, WO 98/03601 and DE 196 49 636, DE 19720-526, DE 197-23 177, DE 297 23 198, DE 197 26 375, DE 19756 084, DE 19756816, DE 198-42 864, DE 198 42 865, WO 99/31193, WO 99/37729, and WO 99/63018.

Preferred fields of use of above mentioned strippable adhesive sheet strips include in particular the residuelessly and nondestructively redetachable fixing of light to moderately heavy articles in the home, workplace, and office segments. In these applications they replace conventional fastening means, such as drawing pins, roundhead needles, thumb tacks, nails, screws, conventional self-adhesive tapes, and liquid adhesives, to name but a few. Key to the successful use of the above mentioned adhesive sheet strips is not only the possibility of residueless and nondestructive redetachment of bonded articles but also their quick and easy bonding and the secure hold they provide for the envisaged period of bonding. It should be borne in mind in particular here that the adhesive strips must possess functional capacity on a large number of substrates in order to be able to act as a universal fixing in the home, workplace, and office segments.

Although the patent literature cited above describes a broad range of pressure sensitive adhesives (PSAs) for use in strippable self-adhesive tapes, commercial products presently on the market (e.g., tesa® Power-Strips®, tesa® Poster-Strips from Beiersdorf AG, 3M Command® adhesive strips from 3M, and Plastofix® Formulae Force 1000 adhesive strips from Plasto S.A.) all feature PSAs based on styrene block copolymers with unsaturated polydiene blocks in the elastomer block. Typically, use is made of linear or radial block copolymers based on polystyrene blocks and polybutadiene blocks and/or polyisoprene blocks, i.e., for example, radial styrene-butadiene $(SB)_n$ and/or linear styrene-butadiene-styrene (SBS) and/or linear styrene-isoprene-styrene (SIS) block copolymers. Advantages of the aforementioned styrene block copolymer based PSAs for use in strippable self-adhesive tapes include, for example, the very high bond strengths that can be achieved with them (owing, inter alia, to the simultaneous realization of very high cohesion and very high adhesive forces), a pronounced reduction in tackiness during stretch release (which greatly facilitates the detachment process or, even, without which the detachment process is impossible), and also a very high tensile strength, essential in particular for a tear-free detachment process.

When using the strippable self-adhesive strips available commercially that utilize pressure sensitive adhesives based on styrene block copolymers it is often possible on sensitive substrates to detect discoloration thereof. The cause of such discoloration are the aging inhibitors normally added to the pressure sensitive adhesives or to their base materials. It is only the substrate which is discolored, while on the adhesive strips themselves, owing to the use of what are called non discoloring aging inhibitors, there are normally no instances of discoloration.

Substrate discoloration may appear to a particular extent if primary antioxidants based on sterically hindered phenols are used, especially if the sterically hindered phenols used contain a 3-(p-hydroxyphenyl)propionic acid group or a 3-(o-hydroxyphenyl)propionic acid group. Antioxidants of this kind are typically used to stabilize styrene block copolymer based PSAs and/or to stabilize many of the base materials used in such PSAs. Owing to the use of such aging inhibitors in many of the base materials used in corresponding PSAs, which is effected by the manufacturers of the base materials, such as, for example, in many tackifier resins or in many styrene block copolymers themselves, the industrial production of adhesives which are free from such compounds is generally not possible. At the same time, moreover, it is often not desirable, since these very same aging inhibitors are highly effective antioxidants.

Examples of aforementioned primary antioxidants containing a 3-(p-hydroxyphenyl)propionic acid group or a 3-(o-hydroxyphenyl)propionic acid group are obtainable, for example, under the brand names Irganox 1010, Irganox 1035, and Irganox 1076 from Ciba Additive, Sumilizer BP 101 and Sumilizer BP 76 from Sumitomo, and Hostanox O 10 and Hostanox O 16 from Clariant, to name-but a very few.

An aim of the invention was to provide a single-sidedly or double-sidedly pressure-sensitively, adhesive sheet strip, utilizing a pressure sensitive adhesive based on styrene block copolymers which is redetachable without residue or destruction even from sensitive substrates by extensive stretching substantially parallel to the bond plane and which at the same time-induces very few instances of discoloration, if any, on the substrate.

The aforedescribed objective is achieved through the additional use of special additives whose mode of action likely derives from their intervention in the oxidative degradation process of primary antioxidants, particularly those antioxidants which contain a 3-(p-hydroxyphenyl)propionic acid group or a 3-(o-hydroxyphenyl)propionic acid group such that only very small amounts, if any, of substrate-discoloring substances are formed. Suitable additional additives are primary antioxidants based on benzyl thioethers, certain lactones, and also certain acrylic acid phenyl ester derivatives, which are described in more detail later on below. Through the additional use of corresponding special additives in pressure sensitive adhesives based on styrene block copolymers it is possible completely, or very substantially, to suppress the discolorations otherwise frequently observed, such as occur, for example, particularly on sensitive substrates such as white-painted woodchip wallpaper. At the same time, it is not possible to detect any influence on the mechanical and technical adhesive properties of the adhesives.

Pressure Sensitive Adhesives

Pressure sensitive adhesives employed are preferably those based on block copolymers comprising polymer blocks formed from vinyl aromatics (A blocks), preferably styrene, and those formed by polymerization of 1,3-dienes (D blocks), preferably butadiene and isoprene. Both homopolymer blocks and copolymer blocks can be utilized in accordance with the invention. Resultant block copolymers may contain identical or different D blocks, which may be partly, selectively or fully hydrogenated. Block copolymers may have a linear A-D-A structure. It is likewise possible to use block copolymers of radial design, and also star-shaped and linear multiblock copolymers. As further components, A-D diblock copolymers may be present. Block copolymers of vinyl aromatics and isobutylene are likewise suitable for use in accordance with the invention. All of the aforementioned polymers may be utilized alone or in a mixture with one another.

Instead of the polystyrene blocks, it is also possible to use polymer blocks based on other homopolymers and copolymers containing aromatics (preferably C-8 to C-12 aromatics) with glass transition temperatures of > about 75° C., such as aromatic blocks containing α-methylstyrene, for example. Also useful are polymer blocks based on (meth)acrylate homopolymers and (meth)acrylate copolymers having glass transition temperatures of >+75° C. In this case it is possible to use both block copolymers which use exclusively blocks based on (meth)acrylate polymers as hard blocks and those which use both polyaromatic blocks, e.g., polystyrene blocks, and poly(meth)acrylate blocks.

Instead of styrene-butadiene block copolymers and styrene-isoprene block copolymers and their hydrogenation products, including styrene-ethylene/butylene block copolymers and styrene-ethylene/propylene block copolymers, it is likewise possible in accordance with the invention to use block copolymers and their hydrogenation products which utilize further polydiene-containing elastomer blocks, such as copolymers of two or more different 1,3-dienes, for example. In accordance with the invention use may also be made of functionalized block copolymers, such as maleic anhydride modified or silane modified styrene block copolymers, for example.

Typical use concentrations for the styrene block copolymers lie within the range between 20% by weight and 70% by weight, preferably within the range between 30% by weight and 60% by weight, with particular preference within the range between 35% by weight and 55% by weight.

As further polymers it is possible for those based on straight hydrocarbons, e.g., unsaturated polydienes, such as natural or synthesized polyisoprene or polybutadiene, elastomers which chemically are substantially saturated, such as saturated ethylene-propylene copolymers, α-olefin copolymers, polyisobutylene, butyl rubber, ethylene-propylene rubber, and also chemically functionalized hydrocarbons, such as halogen-containing, acrylate-containing or vinyl ether-containing polyolefins, for example, to be present, which may replace up to about 100 phr, based on the styrene block copolymer, of the block copolymers containing vinyl aromatics.

PSAs of the invention may be crosslinked chemically, in particular by radiation-chemical means (e.g., by UV irradiation, γ-irradiation, or by exposure to rapid electrons).

Adhesives of the invention are optionally those whose pressure-sensitive adhesion is produced only upon thermal or solvent activation.

Besides those described above based on block copolymers containing vinyl aromatics, suitable PSAs include all those which possess extension, cohesion, and tensile strengths which are sufficient for the detachment process. PSAs of this kind may be used alone or in combination with those based on block copolymers containing vinyl aromatics.

As tackifiers, PSAs of the invention utilize as their main component, in particular, tackifier resins which are compatible with the elastomer block of the styrene block copolymers. Those with preferred suitability include the following: unhydrogenated, partly hydrogenated or fully hydrogenated resins based on rosin and rosin derivatives, hydrogenated polymers of dicyclopentadiene, unhydrogenated, or partly, selectively or fully hydrogenated hydrocarbon resins based on C-5, C-5/C-9 or C-9 monomer streams, polyterpene resins based on α-pinene and/or β-pinene and/or δ-limonene, hydrogenated polymers of preferably straight C-8 and C-9 aromatics. The aforementioned tackifier resins may be used either alone or in a mixture.

As further additives, use may typically be made of light stabilizers, such as UV absorbers, sterically hindered amines, antiozonants, metal deactivators, processing aids, and endblock-reinforcing resins.

Plasticizing agents, such as liquid resins, plasticizer oils or low molecular mass liquid polymers, such as low molecular mass polyisobutylenes having molar masses <1 500 g/mol (number average), for example, or liquid EPDM grades, are used typically in small amounts of <about 20% by weight.

Fillers, such as silica, glass (ground or in the form of beads), aluminum oxides, zinc oxides, calcium carbonates, titanium dioxides, and carbon blacks, to name but a few, and also color pigments and dyes, and also optical brighteners, to name but a few, may likewise be used.

Antioxidants

Normally, primary and secondary antioxidants are added to styrene block copolymer based PSAs in order to improve their aging stability. Primary antioxidants react with oxy and peroxy radicals which may form in the presence of oxygen, and react with them to give less reactive compounds. Secondary antioxidants reduce, for example, hydroperoxides to alcohols. As is known, there is a synergistic effect between primary and secondary aging inhibitors, so that the protective effect of a mixture is frequently greater than the sum of the two individual effects. Primary antioxidants used as standard in PSAs based on styrene block copolymers are, very frequently, sterically hindered phenols which carry a 3-(p-hydroxyphenyl)propionic acid group or a 3-(o-hydroxyphenyl)propionic acid group, such as Irganox 1010, Irganox 1076, Irganox 259, Irganox 1035 and Irganox 1135 from Ciba Additive, Sumilizer BP 101 and Sumilizer BP 76 from Sumitomo or Hostanox O 10 and Hostanox O 16 from Clariant, Anox 20 from Eni Chem Sintesis, or Lowinox PP 35 and Lowinox PO 35 from Chemische Werke Lowi, to name but a few.

When antioxidants are used, especially those of the type mentioned above, there may be red discolorations of the substrate, especially when bonding, for example, to wallpaper or walls painted with emulsion paint or latex paint.

The aforementioned discolorations occur preferentially at the edge of the adhesive strip, pointing to the interaction with atmospheric oxygen. It is noted that the adhesive strips themselves do not visibly discolor, but only the substrate to which they are bonded.

All of the aforementioned antioxidants comprise grades which are praised for not causing discoloration.

In order for the antioxidants or their degradation products to be able to discolor the substrate red, they must first of all diffuse from the adhesive strip into the substrate For this reason it is understandable that the discoloration of the substrate itself depends greatly on the compatibility of the adhesives with the antioxidants and/or their degradation products and thus on the nature of the styrene block copolymers, tackifier resins, and other additives that are used.

In the case of permanent bonds, the aforementioned discolorations frequently are not disruptively manifested in practice, since they are generally not visible. Only the use of redetachable adhesive strips reveals the discolorations in a problematic way, when more or less strongly pronounced red edges appear around the former bond area following detachment. A further decisive influencing parameter on the discoloration tendency is the duration of bonding: the longer an adhesive-strip is in contact with a surface, the greater the possible discoloration of the substrate in the contact region of the bond.

For the assumed reaction with atmospheric oxygen, the antioxidants or their successor products must migrate into the substrate surface. This takes place preferentially if the elastomers and resins are highly nonpolar; the solubility of the typically more polar antioxidants, therefore, in the adhesive is lower. The observed discolorations, however, occur demonstrably even in the case of adhesives which contain polar resins, e.g., rosin esters. Since oxygen is able to act preferentially at the edge of the adhesive strip, it is also here that the first visible discoloration appears, and may become visible after just a few days to several weeks.

Discolorations occur to an increased extent when the adhesive strips are used on very rough substrates for example, on woodchip wallpaper painted with acrylic emulsion paint. As a result of the coarse unevennesses of the wallpaper surface and the incomplete bond which results, atmospheric oxygen is able to pass into the unbonded interstices between adhesive strip and substrate, so that discolorations emerge with particular distinctness.

The easiest way to suppress the red discoloration is to forego the use of antioxidants, particularly the above-described sterically hindered phenols, and especially sterically hindered phenols which contain a 3-(p-hydroxyphenyl)propionic acid group or a 3-(o-hydroxyphenyl)propionic acid group. Since, however, such antioxidants are used as standard in a large number of base materials on the part of the manufacturers, foregoing them is normally not possible in practice. The red discoloration must therefore be influenced through the use of further additives.

Surprisingly it is found that one possibility of suppressing the red discoloration of sensitive substrates is the additional use of special additives which themselves are known as, aging inhibitors or processing protectants. Three groups of additives are capable of preventing or greatly reducing the red discoloration. A first group comprises sterically hindered monocyclic and/or polycyclic phenols containing a benzyl thioether group positioned ortho and/or para to the phenolic OH group. In accordance with the invention it is possible to use monocyclic phenols and polycyclic phenols. Preferred suitability is possessed by 4,6-bis(octylthiomethyl)-o-cresol and 4,6-bis(dodecylthiomethyl)-o-cresol, monocyclic phenols as offered, for example, by Ciba Additive under the brand name Irganox 1520 or Irganox CGX AO 726. Another product of preferred suitability, composed of a mixture of monocyclic and polycyclic phenols, is sold by Goodyear under the name Wingstay K. As a second group, sterically hindered phenols which carry an acrylic-acid phenyl ester group positioned ortho and/or para to the phenolic OH group are suitable in accordance with the invention. Preferred suitability is found to be possessed by 2-tert-butyl-6-(3-tert-butyl-2-hydroxy-5-methylbenzyl)-4-methylphenyl acrylate and 2-[1-(2-hydroxy-3,5-di-tert-pehtylphenyl)ethyl]-4,6-di-tert-pentylphenyl acrylates, which are sold by Sumitomo under the brand names Sumilizer GM and Sumilizer GS. A product chemically identical to Sumilizer GM is available from Ciba Additive under the name Irganox 3052. The aforementioned products do not act themselves principally as primary antioxidants, but rather as C-radical scavengers. The third possibility of achieving a reduction in the red discoloration by adding aging inhibitors consists in adding sterically hindered lactones, substituted compounds with the 3-phenyl-3H-benzofuran-2-one parent structure. Of preferred suitability is the reaction product of 3-hydroxy-5,7-di-tert-butyl-furan-2-one with o-xylene, as sold by Ciba Additive under the name HP 136.

The invention accordingly pertains to a pressure sensitive adhesive for adhesive sheet strips redetachable by extensive stretching in the bond plane, comprising
  a) block copolymer
  b) tackifier resins, and
  c) antioxidant characterized by the presence therein of
  d) sterically hindered monocyclic and/or polycyclic phenol containing a benzyl thioether group positioned ortho and/or pare to the phenolic OH group, and/or
  e) sterically hindered phenol which carries an acrylic acid phenyl ester group positioned ortho and/or para to the phenolic OH group, and/or
  f) sterically hindered lactone.

Since only very small amounts of the above mentioned additives are needed for effective suppression of the effects described, there is virtually no influence on the pressure-sensitive adhesion properties of the adhesives. Just 0.25 part of one of these above-mentioned additives produces a marked reduction in the discoloration tendency. In order to make the discoloration tendency distinctly visible in a test, conditions were chosen for the investigations which favor discoloration after just a short time. These are, firstly, elevated temperatures (+40° C.) and the selection of the paint on which the discoloration tendency is tested. Additionally, as a result of storage in a forced air drying oven, the amount of oxygen which reaches the adhesive strip/wallpaper interface is very high. Discoloration is classified as being visible if a small red edge can be observed when looked at precisely. At this point in time, no discoloration would yet be obvious to a user.

When selecting the base materials for preventing a discoloration it should not be overlooked that the antioxidants (sterically hindered phenols) responsible for the discoloration may already be present in a fraction of up to about 0.4% in the base materials employed. This is also the reason why discoloration of the wallpaper by adhesive strips occurs even, when no additional antioxidants are added (example A1). From examples A2 to A5 it is apparent that in fact the sterically hindered phenols (in this case Irganox 1010 and Irganox 1076) are responsible for the discoloration. An influence on the part of the secondary antioxidants (examples A3, and A4), on the other hand, was not observable.

Suppression of discoloration is successful as shown in examples A6 to A8 with various phenols containing alkylthiomethyl substitution in ortho and/or para position, which are able to retard discoloration by a factor of 4 to 5. Since in normal use indoors the discolorations appear only after several months, such an improvement allows safe use for up to more than one year. Reversible bonds, the only ones where suppressing the red discoloration makes sense, are typically parted after no later than one year. Additionally, the use of sterically hindered phenols containing an acrylate group, compounds substituted in each case in ortho position and para position to OH group or acrylate group, with the parent structure 2-(2-hydroxyphenylmethyl)propionate, which act as C-radical scavengers, reduce the discoloration tendency (example A9). Examples A10 and A11 show that the amount of additional aging inhibitor is decisively responsible for suppressing the discoloration tendency. The decoloring action increases with the amount of additional aging inhibitors. Example A12 shows the decoloring effect of sterically hindered lactones, substituted compounds with the 3-phenyl-3H-benzofuran-2-one parent structure, which act as C-radical scavengers. It is in this class of compound that the decoloring effect is the most strongly pronounced.

Preparation of the Pressure Sensitive Adhesives

Pressure sensitive adhesives can be prepared and processed from solution, from dispersion, and from the melt. Preferred preparation and processing procedures are accomplished from solution and also from the melt. Particular preference is given to manufacturing the adhesive from the melt. For the latter case, suitable preparation operations include both batch procedures and continuous procedures. Particular preference is given to the continuous manufacture of the pressure sensitive adhesive by means of an extruder.

Pressure sensitive adhesives of the invention can be used not only for single-layer self-adhesive tapes redetachable without residue or destruction by extensive stretching (for example in accordance with DE 33 31 016 C2 or DE 42 22 849 C1 or WO 98/03601) but also for multilayer self-adhesive tapes with or without an intermediate foam carrier (corresponding, for example to DE 197 08 366 or DE 198 20 858 or WO 92/11333 or DE 196 49 727 or DE-196 49 728 or DE 196 49 729 or DE 197 20 145 or U.S. Pat. No. 5,516,581 or WO 95/06691). When used in multilayer self-adhesive tapes corresponding to DE 197 08 366 pressure sensitive adhesives of the invention form the outer layers of the adhesive strips. One advantage of using multilayer product constructions in accordance with DE 197 08 366 is the possibility, by appropriate formulation of the inner adhesive layers, of controlling, for example, the stripping forces in very substantial independence from the adhesive properties. Adhesive strips can be shaped in accordance with DE 44 28 587 C2 and U.S. Pat. No. 5,925,459 and/or modified in accordance with DE 44 31 914 C2. Pressure sensitive adhesives of the invention may likewise be utilized in products corresponding to DE 43 39 604 C2.

Double-Sidedly/Single-Sidedly Pressure-Sensitively Self-Adhesive Tapes

Pressure sensitive adhesives of the invention can be utilized for both single-sidedly and double-sidedly pressure-sensitively self-adhesive tapes which are redetachable without residue or destruction by extensive stretching. Single-sidedly pressure-sensitively self-adhesive tapes can be obtained in this case, for example, by neutralizing one side of aforementioned double-sidedly pressure-sensitively self-adhesive tapes or strips.

Converting

Typical converted forms of self-adhesive tapes utilizing the pressure sensitive adhesives of the invention are adhesive tape rolls and also adhesive strips, such as are obtained, for example, in the form of punched items. Punched items optionally include a nonadhesive grip tab region starting from which the detachment operation can be performed.

Test Methods

Determination of the Discoloration Tendency

To produce the test specimens, the test double-sided PSA sheet strips. (dimensions: 20 mm×50 mm) are fastened to a chipboard panel on which painted woodchip wallpaper has been stuck (wallpaper=Erfurt Kömung 52, paint=Herbol Zenit LG). The reverse face of the adhesive strips is not covered. The panels with the adhesive strips affixed to them are then stored in the dark in a forced air drying oven, at 40° C. At weekly intervals, one adhesive strip is detached by peeling or stretching in the direction of the bond plane from the wallpaper substrate, and the wallpaper is then examined for discolorations.

Tensile Strength/Maximum Elongation

Measurements are carried out, unless noted otherwise, in accordance with DIN 53504 using dumbbell specimens of size S3 and with a separation speed of 300 mm/min.

Detachment Force (Stripping Force; Stripping Stress)

To determine the detachment force (stripping force), an adhesive sheet measuring 50 mm*20 mm (length*width), with a nonadhesive grip tab region at the top end, is bonded between two steel plates (arranged congruently with one another) measuring 50 mm×30 mm, in accordance with the procedure described under "tip shear strength (tip shear stability)", but with an applied pressure of 500 N in each case. At the bottom end of each steel plate there is a drill hole to accommodate an S-shaped steel hook. The bottom end of the steel hook bears a further steel plate by means of which the test set up can be fixed in the lower clamping jaw of a tensile testing machine, for the purpose of measurement. The bonds are stored at +40° C. for 24 h. After reconditioning to RT, the adhesive sheet strip is removed with a pulling speed of 1 000 mm/min, parallel to the bond plane and without contact with the edge regions of the two steel plates. During this procedure, the required detachment force is measured in N. The value reported is the mean value of the stripping stress (in $N/mm^2$) in the region in which the adhesive strip has undergone between 10 mm and 40 mm detachment from the steel substrates.

Peel Strength

To determine the peel strength, the PSA strip samples for investigation are laminated over the entire area of one side with a 23 μm PETP film. (Hostaphan RN 25; Mitsubishi Chemicals), without air bubbles, after which the second adhesive sheet strip side is covered at one end with a film strip (likewise Hostaphan RN 25) about 6 mm long, thereby forming at this end a nonadhesive grip tab region on both sides. Thereafter, the test adhesive sheet strip is bonded by its front side, using gentle finger pressure, to the test substrate (coated woodchip wallpaper: wallpaper=Erfurt Kümung 52, paint=Herbole Zenit L G, wallpaper bonded to compressed chip board). Samples are then pressed for 10 s at an applied pressure of 90 N per 10 $cm^2$ of bond area, then conditioned at 40° C. for 15 minutes. The test panels are then fixed horizontally so that the grippable region of the adhesive strips is pointing downward. Using a clamp (20 g), a 20 g weight is fastened to the nonadhesive grip tab, so that the resulting peel load (about 0.7 N per 20 mm of adhesive strip width) acts orthogonally to the bond plane. After 15 minutes and after 24 h, a mark is made of the distance over which the adhesive strip has peeled away from the bond substrate as from the beginning of the test. The distance between the two marks is reported as the peel path (units: mm per 24 h).

Tip Shear Strength (Tip Shear Stability)

In order to determine the tip shear strength, the test adhesive sheet, which measures 20 mm×50 mm and is provided at one end on both sides with a nonadhesive grip tab region (obtained by laminating on 0.25 μm biaxially oriented polyester film measuring 20 mm×13 mm (Hostaphan RN 25)), is bonded to the center of a highly polished square steel plate measuring 40 mm×40 mm×3 mm (length×width×thickness). On its back, the steel plate is provided centrally with a 10 cm steel rod which sits vertically on the surface of the plate. The resulting test specimens are bonded to the test substrate with a force of 100 N (press-on time=5 sec) and are left in the unloaded state for 5 minutes. After the chosen tip shear load has been applied by suspending a weight (10 N with 50 mm lever arm), a measurement is made of the time which elapses until the bond fails (i.e., tip shear stability).

Preparation of the Test Specimens

Preparation of the PSA Strips

PSAs are processed to a homogeneous mixture in a heatable kneading apparatus with sigma blade (Werner & Pfleiderer LUK 1.0 K3, fitted with an LTH 303 thermostat from mgw LAUDA) at a temperature of about +160 to +180° C., the mixture being rendered inert with $CO_2$ as protective gas. After the adhesive has cooled, it is made into single-layer adhesive sheet sections with a thickness of 700 μm±50 μm (mean±2-fold standard deviation) by compressing it for about ten minutes at +120° C. to +140° C. (heatable press: model KHL 50 from Bucher-Guyer). Single-layer PSA strips with the desired dimensions are obtained by punching. In the case of producing multilayer PSA strips, the corresponding layers are obtained beforehand by lamination (by hot lamination where appropriate) and then the adhesive strips are individualized by punching.

EXAMPLES

Since the discoloration tendency emerges to a particularly sharp extent in the case of pressure sensitive adhesives based on hydrogenated base materials, probably owing to the poorer solubility of the antioxidants in said base materials, a corresponding system, as described below, is selected as the base formulation.

Base formula A:
   20parts Kraton G 1650 (SEBS pure triblock)
   30parts Kraton G 1657 (SEBS with diblock content)
   50Regalite R 1100 (hydronated hydrocarbon resin)

| Example No. | Aging inhibitor(s) | Fraction |
|---|---|---|
| Example A1 | Without additional aging inhibitor (materials used as obtained from the manufacturer) | |
| Example A2 | Irganox 1010 | 0.5 |
| Example A3 | Irganox 1010 | 0.5 |
| | Irgafos TNPP | 0.5 |
| Example A4 | Irganox 1010 | 0.5 |
| | Sandostab PEPQ | 0.5 |
| Example A5 | Irganox 1076 | 0.5 |
| | Irgafos TNPP | 0.5 |
| Example A6 | Irganox 1520 | 0.5 |
| | Irgafos TNPP | 0.5 |
| Example A7 | Irganox CGX AO 726 | 0.5 |
| | Irgafos TNPP | 0.5 |
| Example A8 | Wingstay K | 0.5 |
| | Irgafos TNPP | 0.5 |
| Example A9 | Irganox 3052 | 0.5 |
| | Irgafos TNPP | 0.5 |
| Example A10 | Irganox 3052 | 0.25 |
| | Irgafos TNPP | 0.25 |
| Example A11 | Irganox 3052 | 1.0 |
| | Irgafos TNPP | 1.0 |
| Example A12 | Irganox 1010 | 0.25 |
| | HP 136 | 0.5 |

Discoloration tendency

| Example No. | Discoloration tendency; Number of weeks after which discolorations occur with clear visibility |
|---|---|
| Example A1 | 2 |
| Example A2 | 1 |
| Example A3 | 1 |
| Example A4 | 1 |
| Example A5 | 1 |
| Example A6 | 5 |
| Example A7 | 5 |
| Example A8 | 3 |
| Example A9 | 6 |
| Example A10 | 5 |
| Example A11 | 7 |
| Example A12 | 8 |

Mechanical and Technical Adhesive Data

From the following mechanical and technical adhesive data it is possible to see that the addition of small amounts of antioxidants has no effect on the bonding performance and the mechanical properties that are important for the application.

| Example No. | Tensile strength in MPa | Stripping tension in MPa | Peel rate in mm/24 h | Tip shear stability in days |
|---|---|---|---|---|
| A3 | 9.3 | 2.3 | 25 | 22 |
| A7 | 9.5 | 2.3 | 28 | 18 |
| A9 | 9.1 | 2.4 | 26 | 27 |
| A12 | 8.8 | 2.3 | 24 | 13 |

To demonstrate that this effect occurs even in the case of unhydrogenated styrene block copolymers there follow a number of examples with adhesives based on SIS and hydrogenated rosins.

Base Formulation B
   50 parts Vector 4211 (SIS with pure triblock)
   10–50parts Foral 105 (hydrogenated rosin)

| Example No. | Aging inhibitor (s) | Fraction |
|---|---|---|
| Example B1 | no additional aging inhibitor | |
| Example B2 | Irganox 1010 | 0.5 |
| | Irgafos TNPP | 0.5 |
| Example B3 | Irganox 1010 | 0.5 |
| | Irganox CGX AO 726 | 0.5 |
| | Irgafos TNPP | 0.5 |

-continued

| Example B4 | Irganox CGX AO 726 | 0.5 |
| | Irgafos TNPP | 0.5 |
| Example B5 | Irganox CGX AO 726 | 0.5 |
| | Irgafos TNPP | 0.5 |
| Example B6 | Irganox 3052 | 0.5 |
| | Irgafos TNPP | 0.5 |
| Example B7 | Irganox 1010 | 0.25 |
| | HP 136 | 0.5 |

Discoloration tendency

| Example No. | Discoloration tendency; Number of weeks after which discolorations occur with clear visibility |
| --- | --- |
| Example B1 | 5 |
| Example B2 | 3 |
| Example B3 | 6 |
| Example B4 | no discoloration after 12 weeks |
| Example B5 | no discoloration after 12 weeks |
| Example B6 | no discoloration after 12 weeks |
| Example B7 | no discoloration after 12 weeks |

The discoloration tendency is substantially reduced in the adhesives which are much more polar than base formulation A, probably owing to the better solubility of the antioxidants in the pressure sensitive adhesive. A reduction in substrate discoloration is achieved by the same aging inhibitors as were tested positively in base formulation A.

What is claimed is:

1. A single-sidedly or double-sidedly adhesive sheet strip redetachable by stretching in the bond plane, having a pressure-sensitive adhesive comprised of
   a) block copolymer
   b) tackifier resins,
   c) a primary antioxidant selected from the group consisting of sterically hindered phenols
and an additive selected from the group consisting of
   d) sterically hindered monocyclic and polycyclic phenol containing a benzyl thioether group positioned ortho, and/or para to the phenolic OH group,
   e) sterically hindered phenols which carry an acrylic acid phenyl ester group positioned ortho, para or ortho and para to the phenolic OH group,
   f) sterically hindered lactones, and combinations thereof.

2. The adhesive sheet strip of claim 1, wherein the monocyclic and/or polycyclic phenol d) is 4,6-bis(alkylthiomethyl)-o-cresol.

3. The adhesive sheet strip of claim 1, wherein the phenol e) is 2-tert-butyl-6-(3-tert-butyl-2-hydroxy-5-methylbenzyl)-4-methoxyphenyl acrylate or 2-[1 -(2-hydroxy-3,5-di-tert-pentylphenyl)ethyl]-4,6-di-tert-pentylphenyl acrylate.

4. The adhesive sheet strip of claim 1, wherein the lactone f) is a substituted compound with the 3-phenyl-3H-benzofuran-2-one parent structure.

5. The adhesive sheet strip of claim 1, wherein components d), e) and f) are present in total in an amount of 0.01 to 3.0 parts by weight based on 100 parts by weight of the overall pressure sensitive adhesive.

6. The adhesive sheet strip of claim 1, wherein the block copolymer a) is present in an amount of 30 to 65, the tackifier resin b) from 35 to 70, and the antioxidant c) from 0 to 2.5, all in parts by weight based on 100 parts by weight of the overall pressure sensitive adhesive.

7. The adhesive sheet strip of claim 1, wherein the block copolymer a) comprises polymer blocks formed from vinyl aromatics (A blocks), and those formed by polymerization of 1,3-dienes (D blocks).

8. The adhesive sheet strip of claim 1, wherein the antioxidant c) is a primary antioxidant a secondary antioxidant or a combination of a primary antioxidant and a secondary antioxidant.

9. The adhesive sheet strip of claim 4, wherein said lactone is the reaction product of 3-hydroxy-5,7-di-tert-butyl-furan-2-one with o-xylene.

10. The adhesive sheet strip of claim 1, wherein the total amount of components d), e) and f) is 0.02 to 1.0 parts by weight based on 100 parts by weight of the overall pressure sensitive adhesive.

11. The adhesive sheet strip of claim 7, wherein said vinyl aromatics are styrene and said 1,3-dienes are butadiene and/or isoprene and/or hydrogenation products thereof.

12. The adhesive sheet strip of claim 8, wherein said antioxidant is a sterically hindered phenol containing a 3-(p-hydroxyphenyl)propionic acid group or a (3-(o-hydroxyphenyl)propionic acid group.

13. The adhesive sheet strip of claim 1, comprising further additives selected from the group consisting of light stabilizers, antiozonants, metal deactivators, processing assistants, endblock-reinforcing resins, plasticizing agents, fillers, color pigments, dyes and optical brighteners.

14. The adhesive sheet strip of claim 2, wherein the monocyclic and/or polycyclic phenol d) is 4,6-bis(octylthiomethyl)-o-cresol or 4,6-bis(dodecylthiomethyl)-o-cresol.

* * * * *

UNITED STATES PATENT AND TRADEMARK OFFICE
CERTIFICATE OF CORRECTION

PATENT NO. : 6,984,428 B2
APPLICATION NO. : 10/450305
DATED : January 10, 2006
INVENTOR(S) : Krawinkel et al.

It is certified that error appears in the above-identified patent and that said Letters Patent is hereby corrected as shown below:

Column 1, Line 4, "sensitive-adhesive" should read -- sensitive adhesive --

Column 1, Line 6, "sheet-strips" should read -- sheet strips --

Column 1, Line 20, "tape-strips" should read -- tape strips --

Column 1, Line 28, "DE 19720-526, DE 197-23 177," should read -- DE 197 20 526, DE 197 23 177, --

Column 1, Line 29, "DE 19756 084, DE 19756816, DE 198-42 864," should read -- DE 197 56 084, DE 197 56 816, -- DE 198 42 864, --

Column 2, Line 38, "name-but" should read -- name but --

Column 2, Line 41, "pressure-sensitively, adhesive" should read -- pressure-sensitively adhesive --

Column 2, Line 43, "copolymers which" should read -- copolymers, which --

Column 2, Line 46, "time-induces" should read -- time induces --

Column 4, Line 13, "unhydrogenated, or partly," should read -- unhydrogenated or partly, --

Column 5, Line 34, "substrates for" should read -- substrates, for --

Column 5, Line 53, "known as," should read -- known as --

Column 6, Line 1, "acrylic-acid" should read -- acrylic acid --

Column 6, Line 6, "pehtylphenyl)ethyl]" should read -- pentylphenyl)ethyl] --

Column 6, Line 30, "and/or pare" should read -- and/or para --

Column 6, Line 58, "even, when" should read -- even when --

Column 6, Line 63, "A3, and A4)," should read -- A3 and A4), --

Column 7, Line 40, "DE-196 49 728" should read -- DE 196 49 728 --

UNITED STATES PATENT AND TRADEMARK OFFICE
CERTIFICATE OF CORRECTION

PATENT NO. : 6,984,428 B2
APPLICATION NO. : 10/450305
DATED : January 10, 2006
INVENTOR(S) : Krawinkel et al.

It is certified that error appears in the above-identified patent and that said Letters Patent is hereby corrected as shown below:

Column 8, Line 14, "strips. (dimensions:" should read -- strips (dimensions: --

Column 8, Line 16, "Kömung 52," should read -- Körnung 52, --

Column 8, Lines 19-20, "oven, at 40°C." should read -- oven at 40°C. --

Column 8, Line 60, "Kümung 52," should read -- Körnung 52, --

Column 8, Line 61, "chip board" should read -- chipboard --

Column 9, Line 53, "50 Regalite R 1100" should read -- 50 parts Regalite R 1100 --

Column 12, Line 22, "antioxidant a secondary" should read -- antioxidant, a secondary --

Signed and Sealed this

Twenty-seventh Day of March, 2007

JON W. DUDAS
*Director of the United States Patent and Trademark Office*